Oct. 26, 1954
H. A. HADLEY
2,692,772
WEIGHING SCALE
Filed July 20, 1950
2 Sheets-Sheet 1
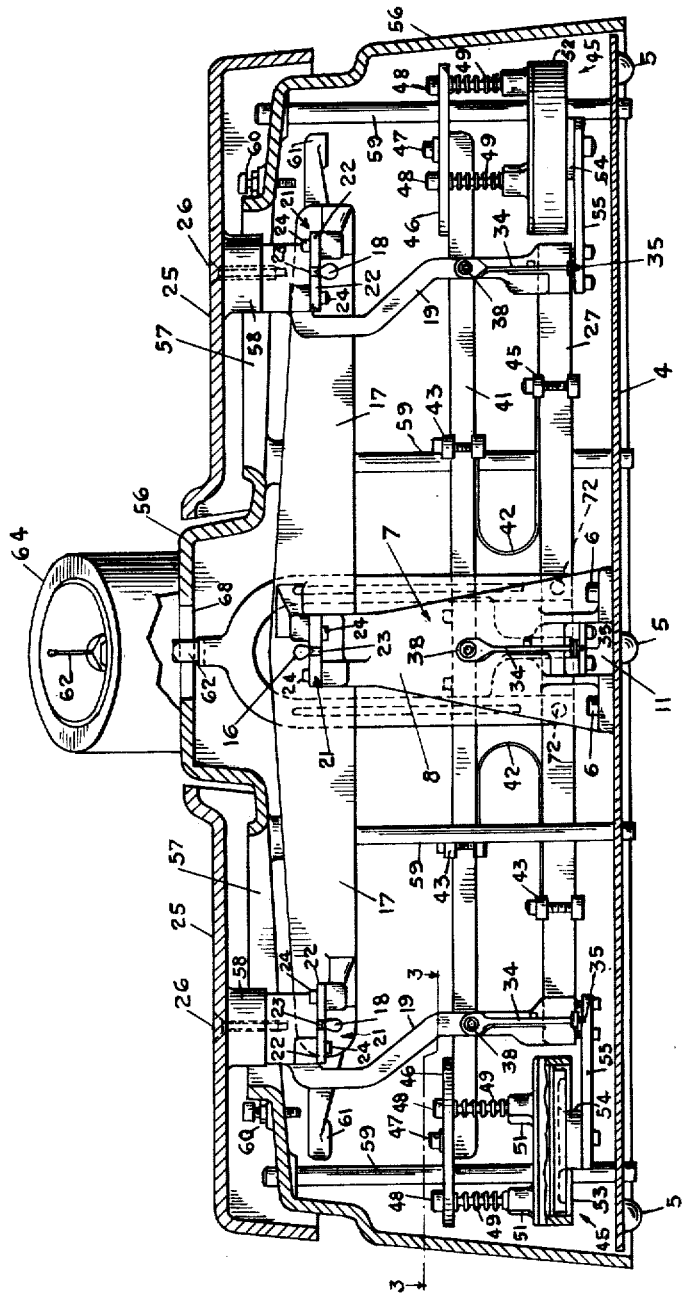
INVENTOR
HARLAN A. HADLEY.
BY
Henry Sherman
ATTORNEY

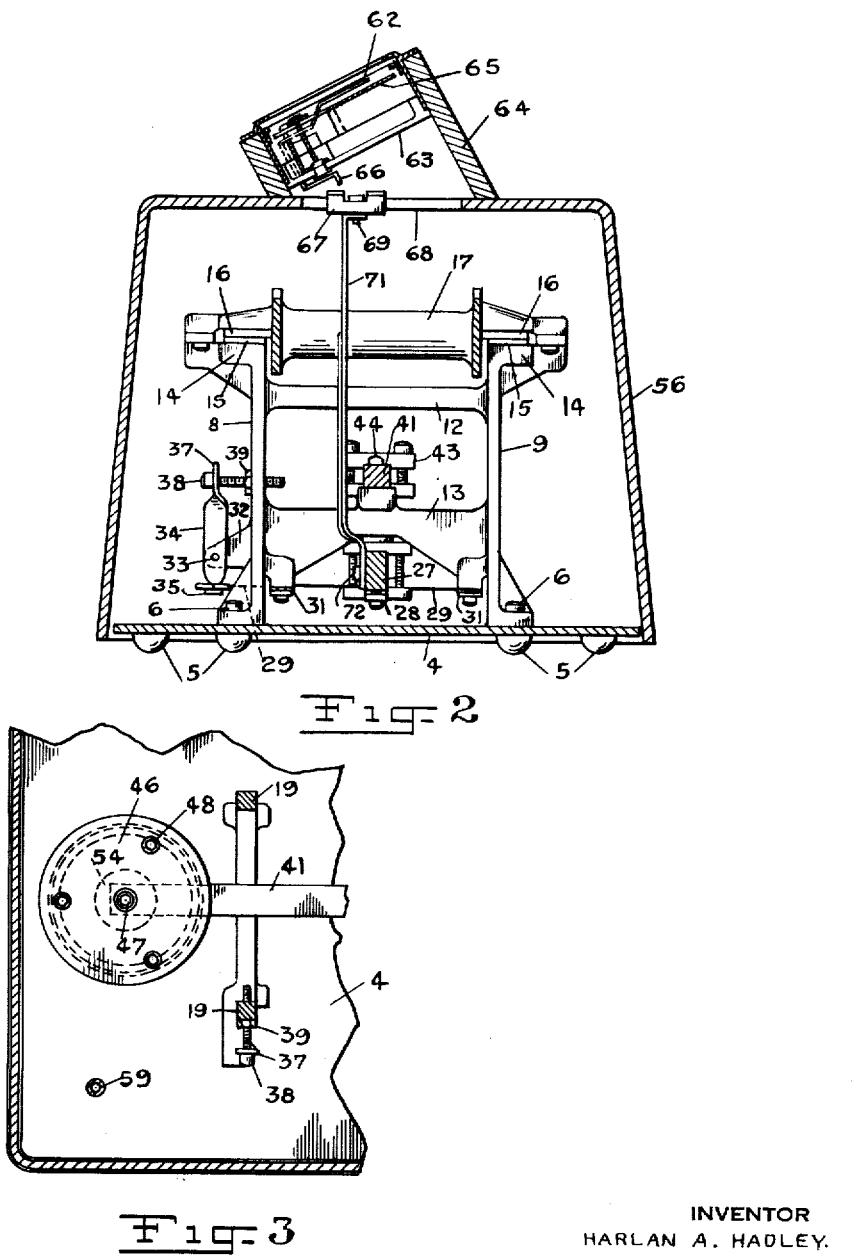

Patented Oct. 26, 1954

2,692,772

UNITED STATES PATENT OFFICE 2,692,772

WEIGHING SCALE

Harlan A. Hadley, Burlington, Vt., assignor to H. A. Hadley Associates, Inc., Burlington, Vt., a corporation of Vermont Application July 20, 1950, Serial No. 174,820

3 Claims. (Cl. 265—54)

My invention relates to weighing scales, and relates more particularly to weighing scales of the equal-arm balance, over-and-under type wherein excess or deficiency in the weight of a load is determined.

Scales of the type with which my invention is concerned are equipped with a centrally fulcrumed lever having two arms of equal length, at the ends of which arms are pivotally supported the load receiving platform and the counterbalancing weight-receiving platform.

The primary object of my invention is to improve generally the construction of equal-arm balance, over-and-under weighing scales.

A more specific object of my invention is the provision of novel means for controlling the sensitivity of the scale.

Another object of my invention is to provide improved means whereby out-of-level conditions and temperature changes are compensated for, and accurate weighing obtained at all times.

Still another object of my invention is the provision of an indicator mechanism of novel construction wherein the weight of the indicator is reduced to a minimum thus reducing the inertia of the moving parts of the scale.

Other objects and advantages of my invention, together with certain details of construction and combinations of parts, will be apparent from the following description and will be pointed out in the appended claims.

In the drawings wherein a preferred embodiment of my invention is shown,

Fig. 1 is a front elevational view of the equal-arm balance scale of my invention with the housing and platform elements shown in vertical cross-section, Fig. 2 is a vertical cross-sectional view showing the weight indicating means arrangement, and Fig. 3 is a horizontal cross-sectional view taken along line 3—3 in Fig. 1 in the direction of the arrows.

Referring now to the drawings for a detailed description of my invention, the reference numeral 4 indicates a base plate on which the scale elements are mounted, the base plate 4 being supported on rubber or plastic casters 5 which are adapted to rest on the bench or counter supporting the scale. The base plate forms part of the housing enclosing the scale elements. Suitably affixed to base plate 4, as by bolts 6, is a fulcrum stand 7. The fulcrum stand comprises two vertical standards 8 and 9, which are bifurcated at their lower extremities as shown at 11, connecetd by integral cross-pieces 12 and 13.

The upper extremities of each standard 8 and 9 are provided with integral bosses 14, the upper surfaces of which receive an optically flat bearing member 15, which may be of agate. The agate bearing member 15 may be cemented or otherwise fixed to the bosses 14. The bearing members 15 support the knife edge fulcrum pivot 16 mounted securely in equal-arm lever 17. A load pivot 18 is also mounted in each end of lever 17. The method of mounting the pivots 16 and 18 in the lever 17 and the method of aligning the same are described in my copending application, Serial No. 126,809, filed November 12, 1949.

Carried by knife edges of load pivots 18 are stirrups 19 having flat agate bearing members (not shown) which rest on said load pivots. Since the bearing members cooperating with the load and fulcrum pivots comprise flat surfaces, means are provided to prevent the shifting of the knife edges of said pivots relative to the flat surfaces of said bearing members. The means herein employed for preventing the shifting of the knife edges is shown and described in my Patent No. 2,611,661, and comprises a flexure member 21 for each pivot and bearing assembly. The flexure member comprises a pair of blocks 22, preferably of a metal such as brass, having fixed between them a resilient web 23 which may be made of rubber or other elastomer. The flexure member is attached at the load pivot positions to the beam 17 and the stirrups 19 and at the fulcrum pivot position to the beam 17 and the fulcrum stand 7 by means of bolts or pins 24. Thus, the flexure members are operatively fixed in the pivot and bearing assemblies in horizontal position with respect thereto, that is, in a plane co-extensive with the plane of the bearings, and with the knife edges of the load pivots and the fulcrum pivot all in the same horizontal plane. The flexure members are so located relative to the horizontal plane in which the knife edges are positioned that any horizontal component will produce no moment, either positive or negative. The flexure members also cause the lever and check-link elements, the latter hereinafter described, to maintain parallelograms even when the platforms 25, which are flexed to stirrups 19 by screwbolts 16, are loaded unequally or when the loads are placed off-center on said platforms.

In weighing scales of the type with which my invention is concerned, there is usually provided a check-link arrangement to maintain the platforms 25 in the desired position. In accordance with my invention, I have provided a check-link arrangement comprising a bar 27 which is attached, by means of suitable clamps 28, to a metal band 29 carried by the fulcrum stand 7 at the bifurcated portions 11 therein and by each of the stirrups 19. The metal bands are maintained in flat position by restraining clamps 31 on the standards 8 and 9 and by similar clamps on the stirrups 19.

The metal bands 29 are caused to be stretched until they are all tuned to the same pitch, whereby the said bands are stressed equally. To this end the standard 8 and each of the stirrups 19 are provided with a bifurcated boss 32 in which is pivotally mounted on a pin 33 a lever 34. The lower end of each lever 34 is provided with a finger 35 which is adapted to fit within an opening provided therefor in a clip 36 fixed to an extending portion of each band 29. The upper end 37 of each lever 34 is twisted at right angles to the body thereof and is provided with an aperture through which extends a threaded bolt 38 which is adapted to be received in threaded holes in the standard 8 and the stirrups 19. The tension on the metal bands 29 is adjusted to the desired degree by turning the bolts 38, a locknut 39 being provided on each bolt 38 to maintain the adjusted position thereof.

The means for controlling the sensitivity of the scale and for assuring the accuracy of the weighing under all conditions comprises a bar 41 and two adjustable bent ribbons 42 of spring-tempered steel fixed to said bar 41 and to the check-link 27 by suitable clamps 43, one at either side of the fulcrum stand 7 and equal spaced with respect to the fulcrum pivot. The bar 41 is substantially rigidly attached to the cross-piece 13 of the fulcrum stand by means of bolts 44. In order to change the sensitivity of the scale, the clamps 43 are loosened and the ribbons 42 moved with respect to the pivot until the desired sensitivity in the scale is attained. The scale mechanism above described is well adapted to weigh accurately when the scale is in an out-of-level position as well as under all atmospheric conditions. It will be seen from the construction described above, any change of moment on one side of the fulcrum pivot is compensated for on the other side of the same.

To dampen the vibrations of the lever 17, an air dashpot arrangement, generally indicated by reference numeral 45, is provided, one on each side of the scale. To this end, the bar 41 has attached thereto, at each extremity thereof, a disk or plate 46 by means of a bolt 47. A plurality of short rods 48 are fixed to and depend from said plates 46 and each has mounted thereon a coil spring 49. The springs 49 are attached to bosses 51 integral with a short cylinder 52. This cylinder 52 is relatively stationary and is adapted to telescope a plate 53 attached to a disk 54 fixed to a bar 55 carried and movable with the stirrups 19.

The scale elements are substantially covered by means of a housing 56 provided with openings 57 through which extend vertical arms 58 carried by the stirrups 19, said vertical arms directly supporting the platforms 25. The housing 56 is supported on a plurality of uprights 59 mounted on base plate 41. A pair of adjustable set screws 60 mounted on housing 56 and serve as stops to limit the travel of the lever 17, operating specifically in connection with arms 61 fixed to said lever 17.

The scale being of the equal-arm balance type, a weight is placed on one platform 25 and the load of substantially the same weight on the other of the platforms. The excess or deficiency of the load is indicated by an indicator 62 comprising a bent steel wire which is pivotally mounted in a plate 63 fixed in a casing 64 supported in an angular position on the scale housing. The plate 63 also supports a chart 65 which normally bears a zero graduation in the center thereof to indicate the exact equilibrium of the load and counterbalancing weight and a series of graduation marks to indicate the amount of excess or deficiency of the load, as is well known in the art.

The portion of the bent wire of indicator 62 extending rearwardly of plate 63 is further bent to provide a finger 66. A permanent magnet 67 extends through an opening 68 in the scale housing into close proximity with the finger 66. The magnet 67 is fixed by a bolt 69 to the upper end of a bifurcated bracket 71 which straddles the fulcrum stand 7 and is fastened to the check-link 27 by bolts 72. Thus, movement of the check-link, effected by movement of the platforms, causes the magnet to move the indicator 62 relative to the chart to indicate equilibrium or excess or deficiency in the load.

The embodiment of my invention above described in connection with the showing in the drawings is to be regarded as illustrative only since my invention is susceptible of variation, modification and change within the spirit and scope of the appended claims.

I claim:

1. In a weighing scale of the class described, the combination with a fulcrum stand, an equal-arm lever pivotally supported on said fulcrum stand, and a check-link operatively connected to said lever, of means for controlling the sensitivity of the weighing scale, said means comprising a bar mounted on said fulcrum stand and fixed relative to said check-link and a pair of bent flat springs attached between said bar and said check-link, one on each side of the fulcrum point of said lever, the construction being such that the attaching means at the ends of said springs are adjustable whereby the relative positions of the ends of said springs along said bar and said check-link may be adjusted, a substantially U-shaped bracket having two free legs attached to said check-link, a magnet mounted on said connecting end, and an indicator movable by said magnet on said connecting end.

2. In a weighing scale of the class described, the combination with a fulcrum stand, an equal-arm lever pivotally supported on said fulcrum stand, and a check-link operatively connected to said lever, of means for controlling the sensitivity of the weighing scale, said means comprising a bar mounted on said fulcrum stand and fixed relative to said check-link and a pair of bent flat springs attached between said bar and said check-link one on each side of the fulcrum point of said lever, the construction being such that the attaching means at the ends of said springs are adjustable whereby the relative positions of the ends of said springs along said bar and said check-link may be adjusted, a bifurcated bracket straddling said fulcrum stand, having a magnet thereon, attached to said check-link at the ends of said bifurcated bracket, and an indicator movable by said magnet on said bracket.

3. In a weighing scale of the class described, the combination with a fulcrum stand, an equal-arm lever pivotally supported on said fulcrum stand, and a check-link operatively connected to said lever, of means for controlling the sensitivity of the weighing scale, said means comprising a bar mounted on said fulcrum stand and fixed relative to said check-link and a pair of bent flat springs attached between said bar and said check-link, one on each side of the fulcrum point of said lever, the construction being such that the attaching means at the ends of said springs are adjustable whereby the relative positions of the ends of said springs along bar and said check-link may be adjusted, and cooperating elements of an air dashpot carried by said bar and said check-link for dampening the vibrations of said lever, a substantially U-shaped bracket having two free legs attached to said check-link, a magnet mounted on said connecting end, and an indicator movable by said magnet on said connecting end.

References Cited in the file of this patent

UNITED STATES PATENTS

| Number | Name | Date |
|---|---|---|
| 299,757 | Brul | June 3, 1884 |
| 1,002,784 | Talbot | Sept. 5, 1911 |
| 1,018,173 | Dunn | Feb. 20, 1912 |
| 1,332,116 | Ewing | Feb. 24, 1920 |
| 1,659,389 | Cameron | Feb. 14, 1921 |
| 1,702,741 | Mojonnier | Feb. 19, 1929 |
| 1,746,251 | Gilbert | Feb. 11, 1930 |
| 1,840,823 | Schaper | Jan. 12, 1932 |
| 1,857,870 | Raasche | May 10, 1932 |
| 1,974,940 | Wood | Sept. 25, 1935 |
| 2,074,983 | Flanagan | Mar. 23, 1937 |
| 2,082,968 | Morris | June 8, 1937 |
| 2,475,684 | Weckerly | July 12, 1949 |

FOREIGN PATENTS

| Number | Country | Date |
|---|---|---|
| 39,655 | Holland | July 15, 1936 |

Disclaimer and Dedication 2,692,772.—*Harlan A. Hadley*, Burlington, Vt. WEIGHING SCALE. Patent dated Oct. 26, 1954. Disclaimer and dedication filed Jan. 2, 1963, by the assignee, *Toledo Scale Corporation*.

Hereby enters this disclaimer and dedication to the public of all claims in said patent.

[*Official Gazette February 19, 1963.*]